United States Patent
Krahn et al.

(10) Patent No.: US 8,380,988 B2
(45) Date of Patent: Feb. 19, 2013

(54) EMBEDDED SELF-CONTAINED SECURITY COMMANDS

(75) Inventors: Darren Krahn, Kanata (CA); Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 910 days.

(21) Appl. No.: 12/184,480

(22) Filed: Aug. 1, 2008

(65) Prior Publication Data
US 2009/0044250 A1 Feb. 12, 2009

Related U.S. Application Data

(60) Provisional application No. 60/935,346, filed on Aug. 8, 2007.

(51) Int. Cl.
*G06F 15/18* (2006.01)
*G06F 15/177* (2006.01)

(52) U.S. Cl. ......................................... 713/167; 726/30

(58) Field of Classification Search ........................ None
See application file for complete search history.

(56) References Cited

U.S. PATENT DOCUMENTS

| | | | |
|---|---|---|---|
| 5,956,715 A | 9/1999 | Glasser et al. | |
| 2002/0019931 A1* | 2/2002 | Prinoth et al. | 713/151 |
| 2003/0163510 A1* | 8/2003 | Janssen | 709/100 |
| 2003/0167280 A1* | 9/2003 | Bradley et al. | 707/103 R |
| 2005/0039178 A1 | 2/2005 | Marolia et al. | |
| 2006/0031685 A1 | 2/2006 | Chen et al. | |
| 2006/0112015 A1* | 5/2006 | Chancellor et al. | 705/51 |
| 2007/0271282 A1* | 11/2007 | Boren | 707/100 |

FOREIGN PATENT DOCUMENTS

| | | |
|---|---|---|
| EP | 1475978 A1 | 10/2004 |
| GB | 2 365 598 A | 2/2002 |
| GB | 2 415 804 A | 1/2006 |
| WO | WO 9715008 A1 * | 4/1997 |

OTHER PUBLICATIONS

ISA/CA, "International Search Report", dated Nov. 4, 2008, pp. 1 to 4.

* cited by examiner

*Primary Examiner* — Venkat Perungavoor
(74) *Attorney, Agent, or Firm* — Kenneth E. Levitt; Dorsey & Whitney LLP

(57) ABSTRACT

A set of commands is provided to a system for execution in order to modify a security related aspect of the system. The system executes the set of commands absent an intervening command being executed, for example by receiving a first command comprising a data portion, extracting a security rights modification command set comprising commands for initiating a secure session and for closing the secure session, and automatically executing the security rights modification command set with a processor, absent other security rights commands being executed. Initiating the secure session may comprise authentication, and the security rights modification command set may provide for security parameters modifiable only during a secure session.

24 Claims, 7 Drawing Sheets

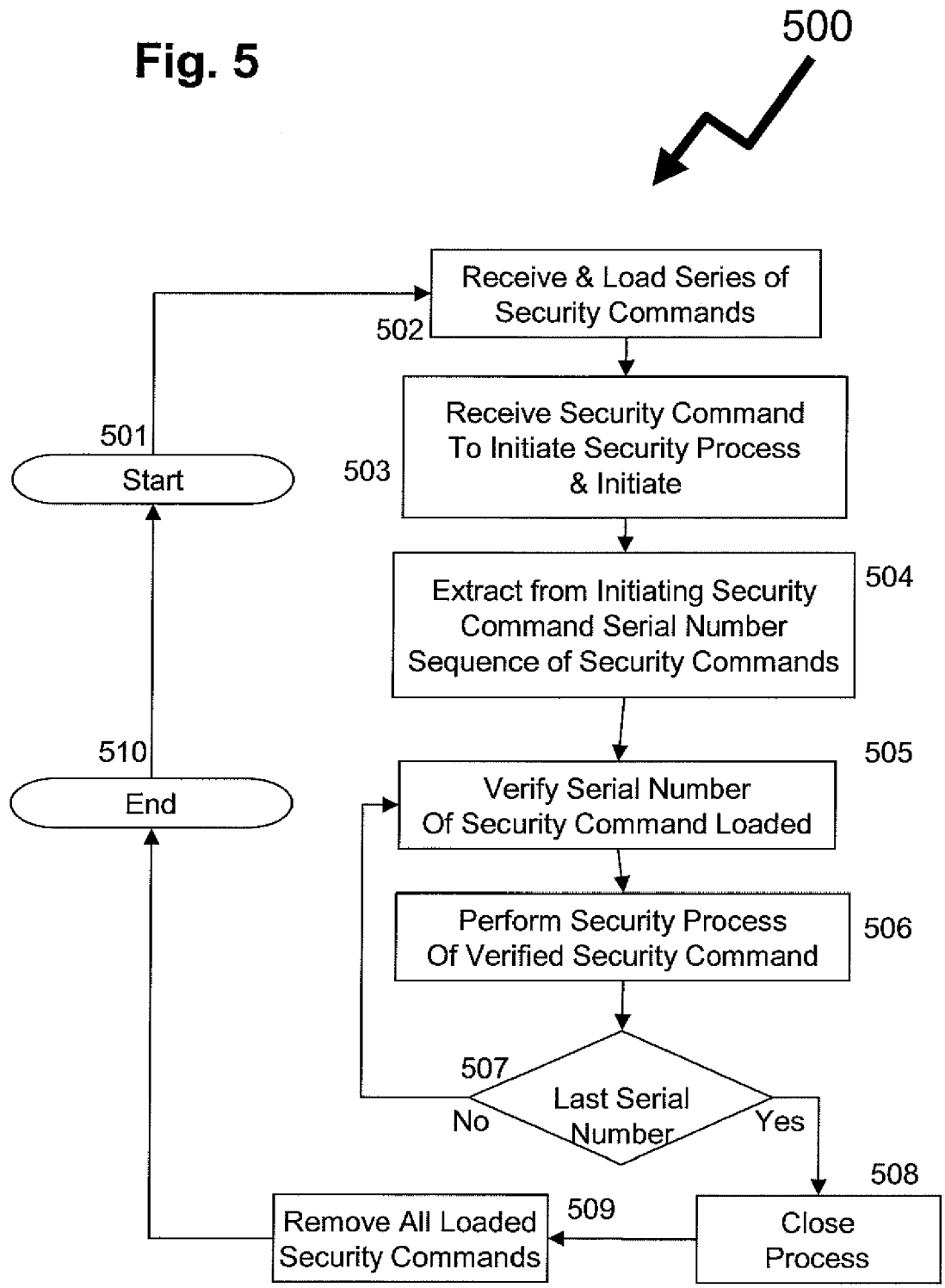

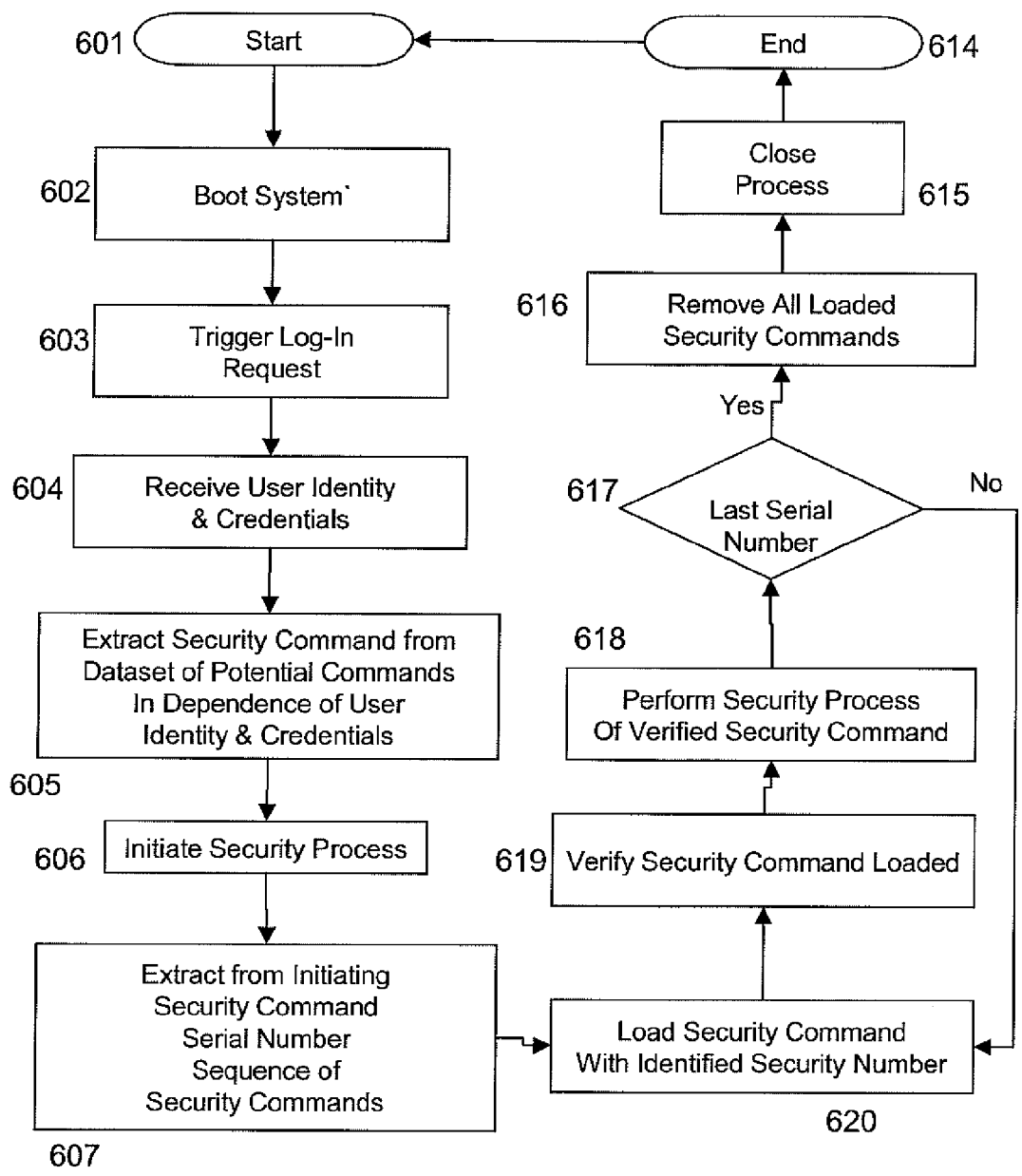

EMBEDDED SELF-CONTAINED SECURITY COMMANDS

FIELD OF THE INVENTION

The invention relates generally to security within microprocessor-controlled devices and more particularly to implementing security configuration changes with single communication commands.

BACKGROUND OF THE INVENTION

A majority of today's businesses utilize some form of computer network These businesses can range from large Fortune 500 organizations, such as Wal-Mart, IBM and Hewlett-Packard, each operating in thousands of locations globally with a combined total of 2.3 million employees, to small family owned businesses with a couple of employees. As such their computer networks may range in scale from hundreds of thousands of electronic devices including for example laptops, personal computers, Personal Digital Assistants (PDAs), Internet enabled cellular telephones, etc. distributed globally, to a couple of devices operated within a restricted geographic area.

However, in each instance these electronic devices are critical elements in the commercial success and viability of each business and enterprise. The necessity of these devices, combined with the ability to employ these electronic devices wirelessly, and increasingly in more remote areas, has resulted in substantial growth in the human resources required to manage these computer networks. Equally, in many instances the requisite knowledge and skills to support the computer network equipment have become resident within a limited number of individuals, such as within Information Systems (IS) departments. Further, IS departments have often been outsourced; or are severely limited or even absent in small businesses. Meanwhile, technological advances in wireless networking, high speed Internet services, the widespread deployment of wireless routers, peer-to-peer applications, and even ad-hoc networking are acting to facilitate the establishment of dynamic local networks as well as to facilitate the provisioning of entire organizational networks without substantial physical infrastructure.

As a result, organizations are increasingly focused on security technologies and security applications to ensure that their critical electronic infrastructure operates and that critical business data is secure. Typically these security technologies and applications are categorized based on the different parts of the problem they solve, including: encryption, digital certificates, firewalls, anti-virus, biometrics, identity management, and intrusion detection and management. At their core these each provide part of the solution to either one of the two major security problems organizations face: loss of computing infrastructure due to denial of service and other types of damaging attacks, and publication or misuse of sensitive corporate information due to unauthorized users gaining access to that information. However, these types of systems are inherently weak when dealing with internally generated trusted user threats—threats that are created by trusted users in conjunction with other "semi-trusted" users that may be inside or outside the enterprise. Additionally, these systems do not address the fundamental management, updating and establishment of security rights and privileges to the trusted users within the current network environment, where the older established server—client architectures no longer exist in the majority of cases.

An annual survey conducted by *CIO Magazine* has consistently shown that more than two thirds of a company's critical data is stored on trusted users' PCs and laptops and less than one third is controlled through a server. Management of security, applications, and user rights on remote computers poses several problems. Historically, providing, amending, removing or otherwise interfacing to security software application (s) on a user's electronic device required a system administrator or other person responsible for administering network applications to either physically go to the user's electronic device or have the user visit with the electronic device to load, configure or unload either server software or security software. Such administrator access was necessary due to the provisioning of an administrator password that allowed the necessary changes to the security application(s). In order to address the need for the administrator to be present, several solutions were developed. In a first solution, the administrator travels to each office to initiate changes in security processes. In another solution, a series of administrators has access to the passwords and to the data resulting in less security since the secret data is known by more people.

Clearly, for these two solutions, the requirement for an administrator presence causes logistical issues such that amendments to security practices, protocols, encryption, passwords, etc often occurred over an extended period of time, if they are completed at all. This is in contrast to the optimal situation wherein security changes are provisioned near instantaneously to all electronic devices associated with the organization, in order to react to external and internal threats and events.

As a result of the above, in recent years security solutions have tended to diverge such that either the sensitive information is secured as a discrete entity or administrators are empowered to access the electronic devices remotely. In the former approach of securing the discrete entity the predominant approaches include passwords, watermarks, and digital signatures, such as provided for example by Microsoft® Office or Portable Document Format (PDF) by Adobe Systems®, or providing secure wrappers which include security authorizations and access protocols. See for example Duncan et al. in US Patent Application 2005/0114672 "Data Rights Management of Digital Information in a Portable Software Permission Wrapper".

In the second scenario with network administrators exploiting new network management hardware and software to provide remote access to a networked computer, administrators are often tasked with performing such duties at times when the trusted user will not be negatively impacted (for example at night). Such an approach is outlined by Angelo in U.S. Pat. No. 5,949,882 "Method and Apparatus for Allowing Access to Secured Computer Resources by Utilizing a Password and an External Encryption Algorithm". In some instances, national directives conflict with the network administrators' intentions, such as for example the US Environmental Protection Agency (EPA), where the Energy Star Program has been very successful in reducing computer power consumption via the creation of so-called "green" computers. The term "green computer" typically refers to a computer that enters low-power mode following a specified period of inactivity. The proliferation of green computers in networks, while laudable, can interfere with a network administrators duties since a computer in sleep mode (or another low power state) often cannot be accessed from the network. As such, techniques to remotely power on "sleeping" electronic devices have become available through commercial activities such as MAGIC PACKET™, led by Advanced Micro Devices® and Hewlett Packard®. Equally, others have addressed remotely powering down electronic devices, such as for example Angelo et al. in U.S. Pat. No. 6,119,228 "Method for Securely Communicating Remote Control Commands in a Computer Network", to prevent unauthorized access.

However, in establishing their administrator access Tights to the electronic device whilst the trusted user is probably not present, the network administrator may inadvertently provide access to an untrusted user who can access and utilize the electronic device whilst the administrator's rights are established. The untrusted user may be physically present or be represented by malware established on the trusted user's electronic device, awaiting such admninistrator access prior to activating. Such malware could for example then take control of the electronic device by resetting passwords, security rights etc, and communicating sensitive data or security information to another party. Equally, the trusted user may themselves exploit the temporary access to copy, move, delete or modify information that would otherwise be protected or invisible to them. Further, the techniques of Angelo (U.S. Pat. No. 5,949,882) and Angelo et al. (U.S. Pat. No. 6,119,228) exploit encryption/decryption according to normal practices such as the network administrator's public key. In this scenario a "hacker" benefits significantly from expending the effort to crack the encryption as doing so provides them with access to potentially thousands of devices and substantial amounts of sensitive corporate and personal information, unlike an attack on a single discrete user or user's electronic device.

Accordingly, it would be beneficial to provide a method for allowing a network administrator or authorized user to simply augment or modify the security aspects of an electronic device irrespective of location and current user activities without suffering at least some of the above noted disadvantages.

SUMMARY OF THE INVENTION

Various embodiments of the invention provide methods and systems for receiving a first command comprising a data portion, and extracting from the data portion a security rights modification command set comprising a command for initiating a secure session and for closing the secure session, where the security rights modification command set is configured for modifying security parameters during the secure session. Some of the security parameters may be modified only during a secure session; and the security rights modification command set can be automatically executed, absent other security rights commands being executed during execution of the security rights modification command set.

In additional aspects of the invention various devices may be provided, for example a port for receiving the first command, and a processor for extracting the security rights modification command set. The processor may be configured for establishing a processor environment where commands other than those within the security rights modification command set are other than executable, and for executing the security rights modification command set absent other security rights commands being executed during execution of the security rights modification command set.

In further aspects of the invention the security rights modification commands include serialization data for identifying and ordering said security rights modification commands. The security rights modification commands may be stored within a memory, and receiving the first command may indicate a set of security rights modification commands whereby the indication is extracted from the first command. The set of security rights modification commands may be executed in dependence of the extracted indication, for modifying security parameters during the secure session, some of the security parameters for being modified only during a secure session; and, for closing the secure session absent at least one of another security rights command being executed and another secure session being initiated during the secure session.

BRIEF DESCRIPTION OF THE DRAWINGS

Exemplary embodiments of the invention will now be described in conjunction with the following drawings, in which:

FIG. 5 illustrates an exemplary flow diagram of a security command process with pre-loaded serialized commands within single security session.

FIG. 6 illustrates an exemplary flow diagram of a security command process as part of a log-in process.

DETAILED DESCRIPTION OF EMBODIMENTS OF THE INVENTION

Figure 1:
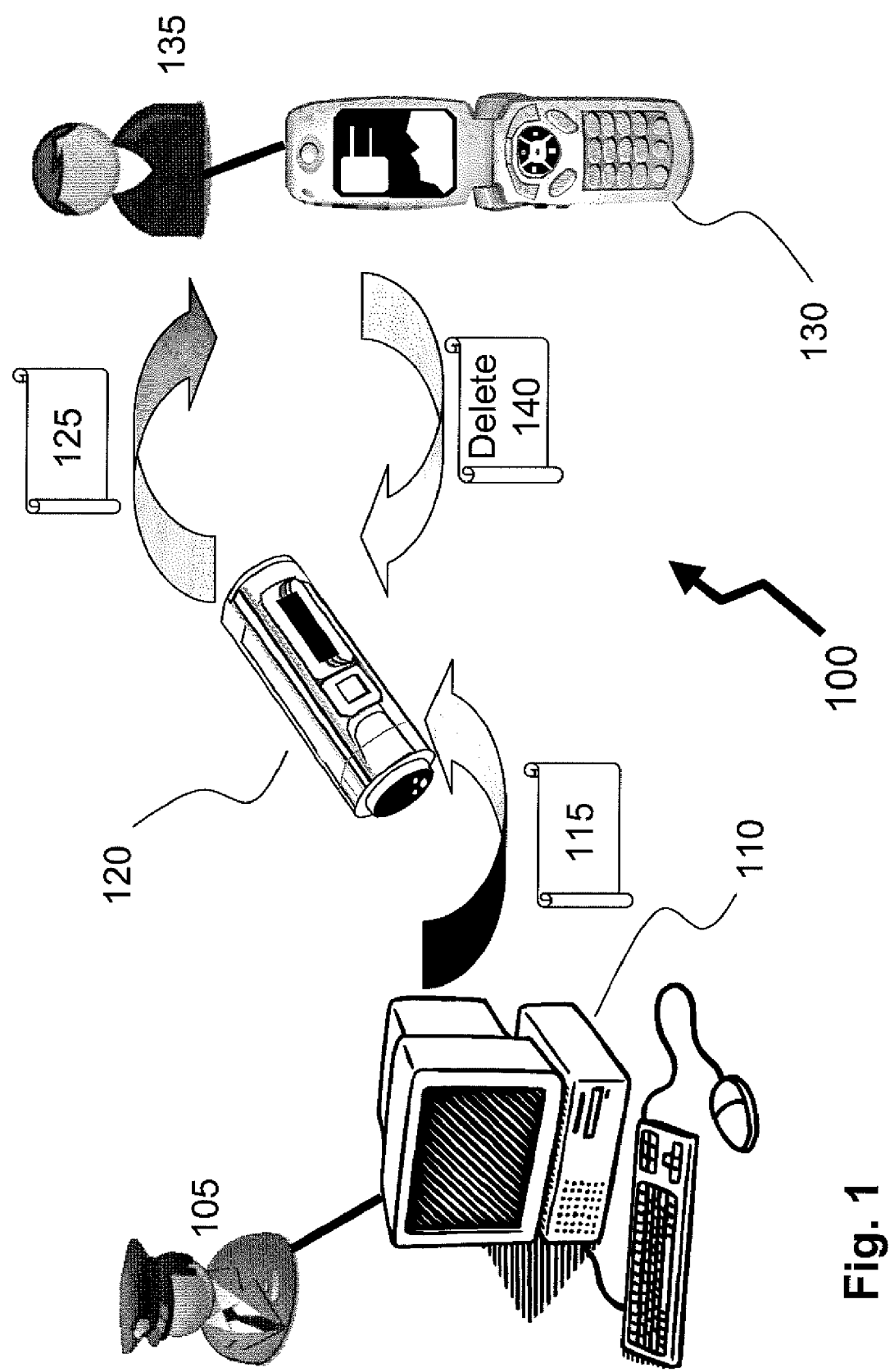
FIG. 1 illustrates an exemplary transfer of an embedded security command using a removable memory storage device.

Referring to FIG. 1 there is shown an exemplary transfer 100 of an embedded security command from an administrator system 110 to a user's electronic device 130. Accordingly, an Information Systems (IS) administrator 105 wishes to change the security privileges of the users, including user 135, of an enterprise's electronic information technology systems, not shown for clarity. The IS administrator 105 accesses the administrator system 110 and defines the required security amendments for the user 135. Once defined, the security amendment command is embedded within a command that is compatible with an interface of the user's electronic device 130, which accepts a removable storage medium 120. This embedded security amendment command 115 is then transferred to the removable storage medium 120 by the IS administrator 105, whereupon the removable storage medium 120 is provided to the user 135 either directly or indirectly via shipping.

Upon receipt of the removable storage medium 120 the user 135 inserts the removable storage medium 120 into the appropriate interface port of the user's electronic device 130, whereupon the embedded security amendment command 115 is recognized and transferred to the user's electronic device 130 as executing embedded security command 125. Within this exemplary embodiment the executing embedded security command 125 establishes itself as the sole process operating on the user's electronic device 130, extracts the embedded security command, executes it, and then terminates the process. In terminating the process a delete command 140 is, optionally, provided to the removable storage medium 120 from the user's electronic device 130.

As such the exemplary transfer 100 results in the security process operating on the user's electronic device 130 and/or security settings being updated in a single step without interaction of the user 135 or IS administrator 105 during the execution activity. In establishing itself temporarily as sole operating process and suspending other processes the security process reduces the risk of malware attacks or executions. Optionally, executing embedded security command 125 disables user input devices such as keyboard, microphone, mouse etc to remove potential for the user 135 to abuse any rights temporarily established in the execution of the executing embedded security command 125. The exemplary transfer 100 exploits a removable storage medium 120 that is for example a flash memory device, a secure digital memory card, a smartcard, or a compact, low cost memory device. Optionally, when terminating the process, instead of or in addition to erasing the stored security commands, result data detailing success or failure of the security rights process is stored in the security commands' place. It will be evident that when erasing of the data is not considered important, that unerasable media such as compact disks, DVDs, and other write-once media are suitable for the data transfer.

Sometimes, the security updates are required to be executed in a time sensitive manner, in significant numbers, or over a wide geographic territory, such that the physical distribution of the removable memory storage device 120 of exemplary transfer 100 is undesirable, being for example too slow or too expensive. Accordingly, in FIG. 2A an electronic transfer 200A is shown in respect of providing security updates to electronic devices 230, 240, 260, 270 and 280. Having determined that a security policy revision is required, an IS administrator 205 accesses an IS administrator system 210 to initiate the policy revision. In initiating this revision the security policy command is embedded within another command, in a format accepted by the plurality of electronic devices 230, 240, 260, 270 and 280. A resulting generic embedded security command 215 is then distributed to the electronic devices 230, 240, 260, 270 and 280 from the IS administrator system 210.

Within the exemplary electronic transfer 200A the generic embedded security command 215 propagates across a World Wide Web 220 to a local router 250 wherein it is distributed to the electronic devices 230, 240, 260, 270 and 280. As shown, the generic embedded security command 215 is therefore provided to WiMAX router 230, laptop 240, Global Navigation device 260, multi-media player 270, and PDA 280. Upon receipt of the generic embedded security command 215 each of the electronic devices 230, 240, 260, 270 and 280 extracts the security command, disables all other processes, executes the security command process to modify security parameters, and terminates the security command process before returning control to the user or network as appropriate according to the nature of the plurality of electronic devices 230, 240, 260, 270 and 280. In establishing, executing, and terminating the security command process a secure session is established such that the security command process establishes administrator access rights to perform the modifications to the security processes, and then closes the administrator access and secure session before returning control of the processor.

Optionally the establishment and termination of the administrator access rights includes the logging in and logging out of the administrator. Alternatively the security policy command is a plurality of commands which are extracted and executed within the secure session, such a security rights command set allowing modification of a single right or alternatively a plurality of rights to be modified within the security process or secure session. For example, the access privilege of a single user may be modified in the session or the access privileges for each user of a user group may be modified in the session.

Alternatively, the security command update is executed without interrupting existing activities on each of the plurality of electronic devices 230, 240, 260, 270 and 280; in this case the security process is executed in the background without knowledge of the user. Optionally, a message is provided upon completion of the security update to advise the user that their security policy has been revised or amended.

Figure 2A:
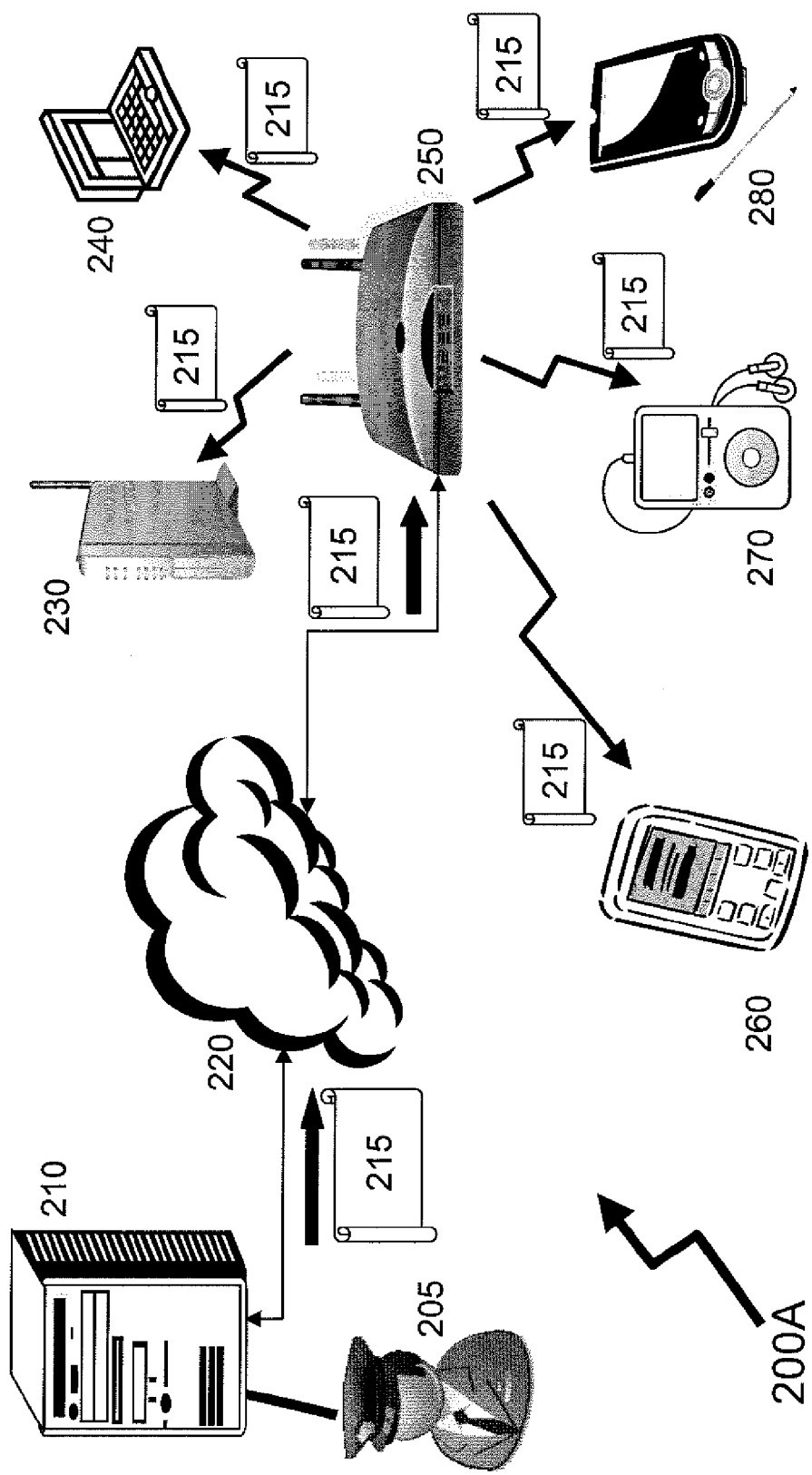
FIG. 2A illustrates an exemplary transfer of a generic embedded security command using the Internet as interconnecting network between administrator and user.
Figure 2B:
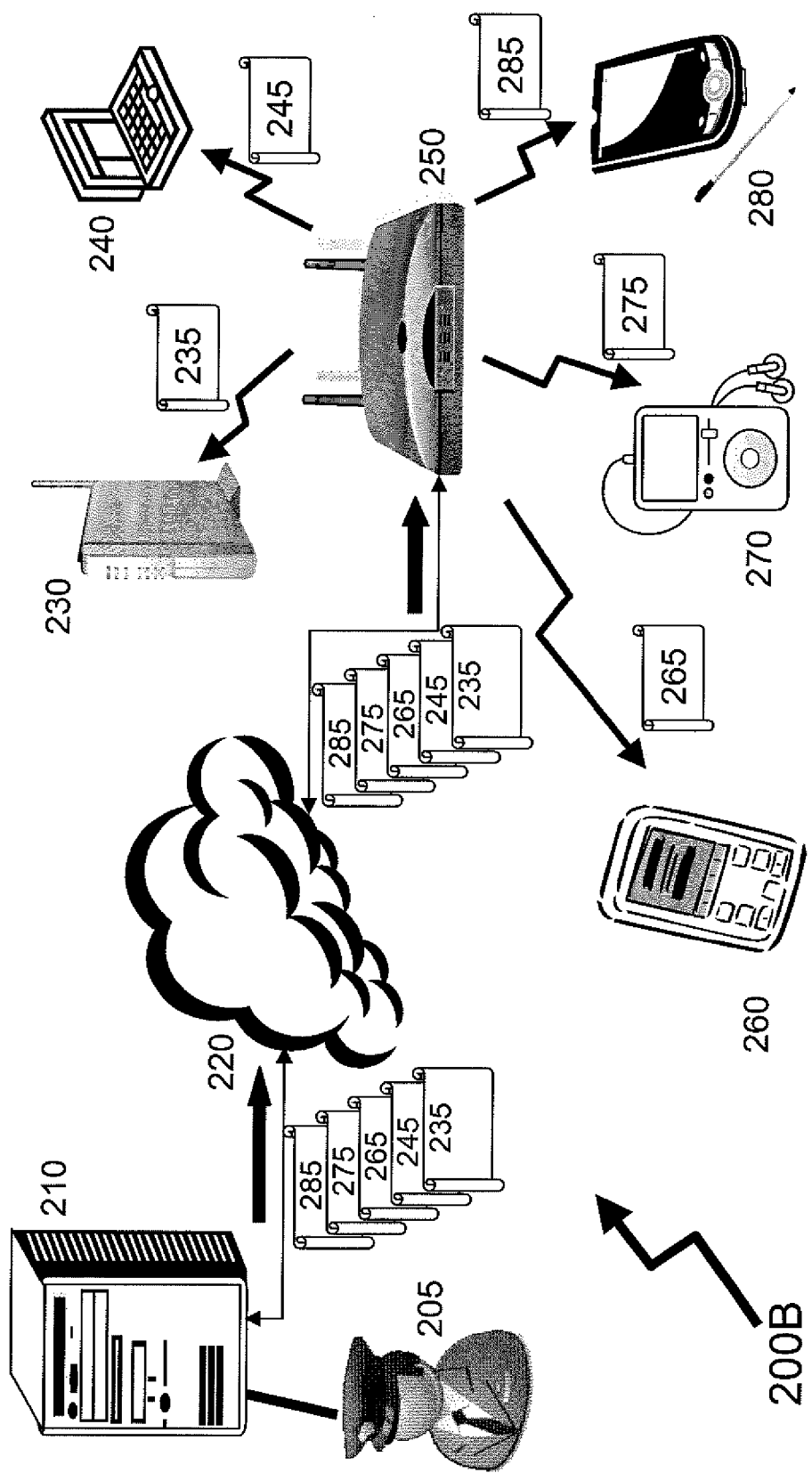
FIG. 2B illustrates an exemplary transfer of device-specific embedded security commands using the Internet as interconnecting network between administrator and user.

Alternatively, as shown in FIG. 2B the security policy generator process executing on the IS administrator system 210 generates a device-specific command for each of the plurality of electronic devices 230, 240, 260, 270 and 280, as shown in exemplary transfer 200B. As such the security policy generator process generates router command 235 for the WiMAX router 230, computer command 245 for the laptop 240, GPS command 265 for the Global Navigation device 260, media command 275 for the multi-media player 270, and an assistant command 285 for the PDA 280. Each of the plurality of security embedded commands 235, 245, 265, 275, and 285 are distributed via the World Wide Web 220 and local router 250 to the plurality of electronic devices 230, 240, 260, 270 and 280. Upon receiving and detecting the appropriately formatted command each device extracts the embedded security command and executes same.

As presented supra such commands optionally provide additional security elements during their execution, including the temporary disabling of input devices, temporary disabling of network access, notification of completion or failure of security update, and user notification. Optionally, a single standard command is issued to the plurality of electronic devices 230, 240, 260, 270 and 280 but each of the plurality of security embedded commands 235, 245, 265, 275, and 285 is formatted according to the interfaces supported by each of the plurality of electronic devices 230, 240, 250, 260, 270 and 280. Alternatively the format will reflect that some of the electronic devices are operating on different operating systems, such as for example Apple Mac OS X®, Microsoft Windows®, Microsoft Vista®, Sun Solaris™, and Linux.

Figure 3:
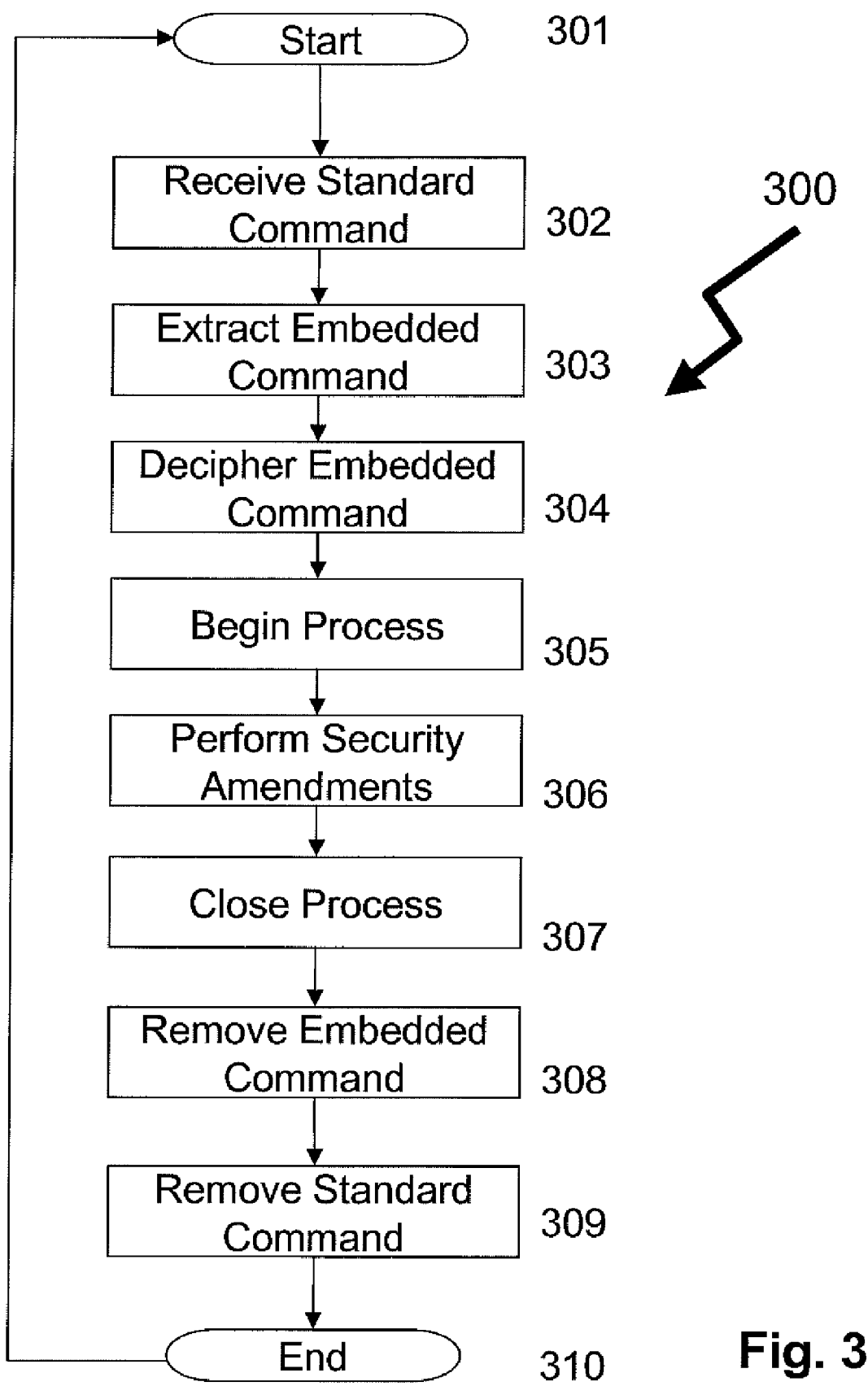
FIG. 3 illustrates an exemplary flow diagram of a user's electronic device receiving and executing an embedded security command.

Each of the plurality of electronic devices 230, 240, 260, 270 and 280, as described in FIGS. 2A and 2B, optionally executes the exemplary sequence 300 as outlined in FIG. 3. Exemplary sequence 300 begins with a start 301, such that a process is active within an electronic device intended to receive and process security protocol updates according to an embodiment of the invention. At step 302 receipt of a standard command occurs wherein the operating process recognizes that the command has associated data that is an embedded command of the security policy process. For example, the standard command comprises a login command to initiate an administration session. The process then proceeds to extract the embedded command at step 303 and decipher the command in step 304. Information necessary for deciphering the embedded command has previously been established on the electronic device, for example at initial supply to a user or subsequently via another security process download.

The deciphered command from step 304 thereby results in the security policy process beginning at step 305 and performing security amendments at step 306. Upon completing the necessary security amendments in step 306 the process closes at step 307. Now progressing to optional step 308 the embedded command is removed from the electronic device, for example using a secure delete process, and thereupon at optional step 309 the received standard command is also removed from the electronic device, again for example by a secure delete process. Finally the sequence moves to step 310 and ends, whereupon it returns to step 301 to await a subsequent policy update.

Figure 4:
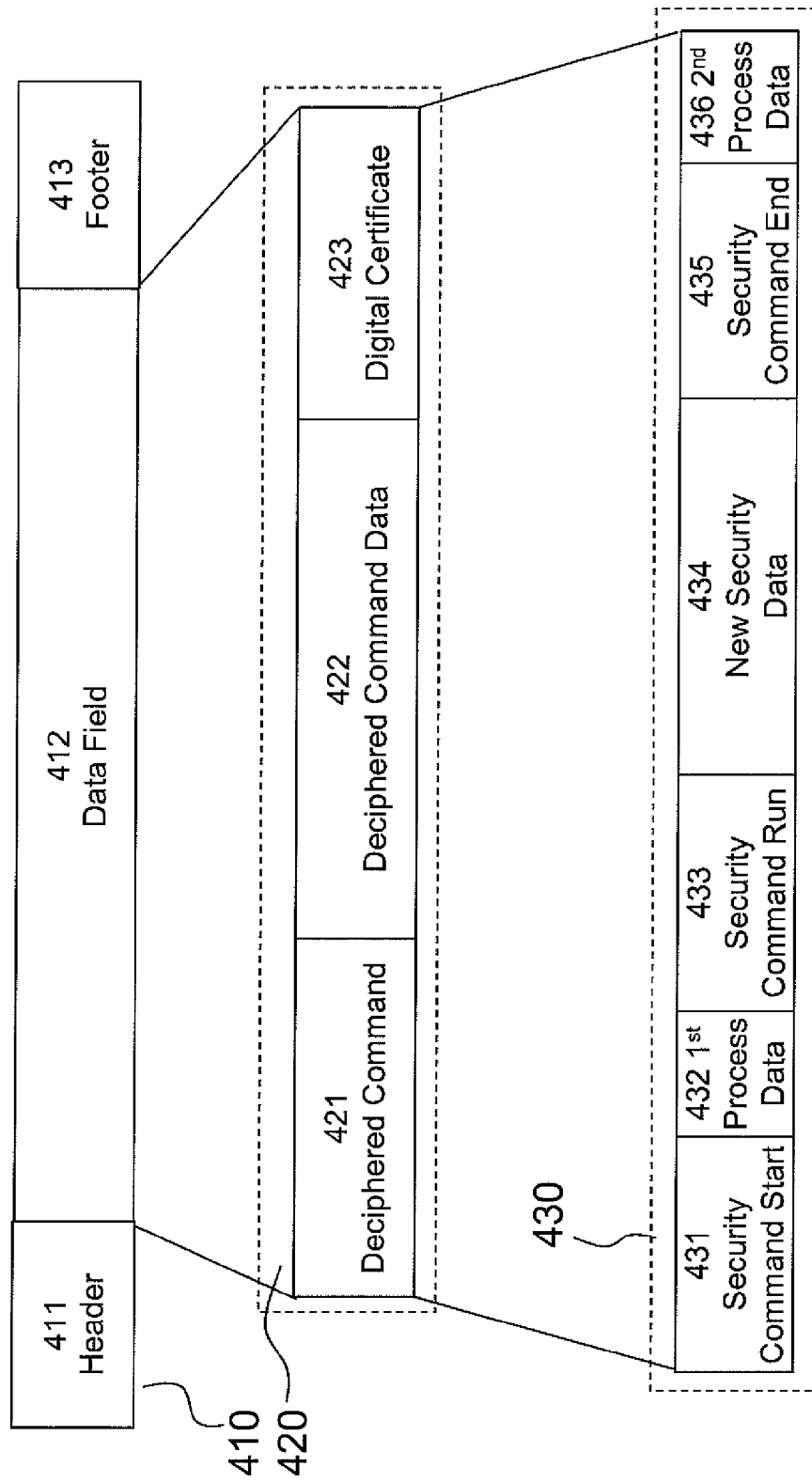
FIG. 4 illustrates an exemplary embedded command structure and extracted commands.

Now referring to FIG. 4 shown is an exemplary command hierarchy 400. The command hierarchy 400 comprises a plurality of public commands, including public domain command 410, which are for example embedded security amendment commands 115 of FIG. 1 or one of a plurality of security embedded commands 235, 245, 265, 275, and 285 of FIG. 2B. Public domain command 410 comprises a header 411, a data field 412 and a footer 413. The header 411 and footer 413 represent standard command elements of a format that communicates the security policy update command to the electronic device, for example a command supported by a Universal Serial Bus (USB), Advanced Technology Attachment (ATA), I2C interface, HTML or SMTP protocol, etc. The data field 412, rather than being data associated with the public domain command 410 as normally employed, comprises an encrypted embedded security command 420. The encrypted embedded security command 420 has a format such that a process receiving the public domain command 410 can identify the data field 412 as the encrypted embedded security command 420, rather than data associated with the public domain command 410.

Decryption of the encrypted embedded security command 420 results in a deciphered command 421, deciphered command data 422 and a digital certificate 423. The digital certificate 423 is employed by the security process to further validate the security policy command as originating from a valid authority. Alternatively, an element such as the digital certificate 423 is optionally omitted. Within this exemplary command hierarchy 400 the deciphered command 421 and the deciphered command data 422 together provide a security command 430 to the electronic device. The security command 430 comprises a security command start 431 with associated first process data 432, a security command run 433 with new security data 434, and a security command end 435 with second process data 436. For example, the security command start comprises a login command to initiate an administration session. The first process data 432 and the second process data 436 are optionally employed and relate to processes to be suspended and restarted respectively before and after execution of the security command run 433. For example, the first process data 432 suspends wired and wireless network access during modification of security protocols and establishment of a new enterprise server, identified in the new security data 434, and the second process data 436 restarts only wired network access and provides a security lock on wireless network access.

In another example, the first process data 432 suspends Microsoft Outlook® and disables the keyboard of the electronic device, such as that of PDA 280, before the security command run 433 establishes the new policy rules for Microsoft Outlook®, which includes the encryption and provision of an SSL certificate for authentification of electronic mail generated by the user with Microsoft Outlook®. In this example, the SSL certificate is the digital certificate 423. Finally, the second process data 436 resumes operation of Microsoft Outlook® to the user and enables the keyboard of the PDA 280.

In the exemplary processes described supra the security session has been described in respect of a single security session performed in conjunction with extracting a series of security commands embedded within a single command. Referring to FIG. 5 another exemplary embodiment is presented wherein the single security session is executed using a plurality of serialized security commands that have been preloaded. As such in FIG. 5 the exemplary security rights update 500 begins with a start 501, such that a security rights process is already active within an electronic device, and performs according to previously established rights and is intended to receive and process security protocol updates according to an embodiment of the invention. At step 502 a series of security commands are received by the electronic device and are recognized by the already executing security rights process and are loaded awaiting execution, each security command being serialized with unique serialization data.

The process then proceeds to step 503 wherein the process receives a security command to initiate a security rights process, and accordingly initiates the security process. Accordingly the executing security process does not allow the loading of any additional security commands or other commands during execution thereof, thereby preventing a malware attack which upon recognizing the executing security process attempts to insert an additional security process command or replace an existing command. The process flow then proceeds to step 504 and extracts embedded serialization data to the sequence of security commands to execute. Upon extracting this series the process proceeds to step 505 and verifies that an existing loaded command with the matching serialization data exists. Having verified the security command this security command is then executed at step 506 from which point the process moves to step 507 to determine whether additional commands remain to be executed. Upon determining that other commands exist the process returns to step 505 and verifies the next security command serial number prior to executing it within step 506.

Upon determining in step 507 that the last command has been executed the process moves to step 508 and closes the security rights update process before moving forward to optional step 509 and deleting all loaded security commands wherein the security update process ends at step 510 and returns to start 501 to await receipt of new security commands. Accordingly, the security rights update 500 prevents a malware attack from inserting commands once in execution, as no new external commands are loaded or executed, and also provides for verification that the appropriate number of commands and their specific unique serial numbers are present prior to execution of them. In this manner the insertion by malware of a Trojan command into a security rights process update prior to its execution is prevented as the serialization of the commands being executed must be correct, such that random insertion of serialization data into the Trojan command has a very low probability of matching a valid command. Optionally, when terminating the process, instead of or in addition to erasing the stored security commands, result data detailing success or failure of the security rights process is stored in the security commands' place. The result data is then transmitted back to IS administrator.

Optionally the serialization data is a unique serial number associated with each security command and the serialization command may be the list of serial numbers in order to execute. Alternatively the serialization data relates to linking the security commands together such that only the correct serialization commands form the valid security command to be executed, by way of analogy a hundred puzzle pieces are provided but only ten can be assembled to form a picture.

Optionally, the loading of the security commands prior to receipt of the command to initiate the security process is achieved for example by downloading a plurality of encrypted and embedded commands distributed over a period of time from a communications network, by connecting a security module containing the commands to the electronic device, or by a combination of such methods. Alternatively, a small group of desired security commands are provided in conjunction with a large number of masking security commands, the masking security commands being indistinguishable from the desired commands but are not called by their serial numbers. As such with today's high speed communications networks a limited number of desired security commands is distributable randomly through a large number of downloaded commands. The downloaded commands that provide masking of the desired security commands may be the standard command with random data within the data field, the standard command with security commands with invalid fields, and standard commands with security commands with valid fields but unused serial numbers. Such masking further limiting the ability of malware attacks as the valid security commands form only a small percentage of the commands transmitted to the electronic device.

In another exemplary embodiment, the security commands are embedded within a login process or command. Such an exemplary embodiment is presented in FIG. 6 wherein a single security session is executed from a plurality of possible security sessions, each security session using a plurality of serialized security commands. Alternatively the security session may be a single embedded command from within the dataset as outlined supra in respect of FIGS. 3 and 4. As such a login triggered single security session 600 begins with a start 601. At step 602 the system boots and triggers in step 603 a login request. Alternatively the system may be active and the login trigger for step 603 is not a system boot but a request to change the user or a request to reconfirm a current user. At step 604 the result of the login trigger is received, being a user identity and login credentials, whereupon the single security session moves to step 605 and extracts a security command from a dataset of potential security commands. The security command selected being determined in dependence of the user identity and login credentials presented in step 604.

The process then proceeds to step 606 and initiates the security process. Accordingly the executing security process does not allow the loading of any additional security commands or other commands during execution thereof, thereby preventing a malware attack, which upon recognizing the executing security process attempts to insert an additional security process command or replace an existing command. The process flow then proceeds to step 607 and extracts an embedded string of serial numbers relating to the sequence of security commands to execute. Upon extracting this series the process proceeds to step 620 and loads the security command with the identified security number before this security command is verified in step 619. Having verified the security command serial number this security command is then executed at step 618 from which point the process moves to step 617 to determine whether additional commands remain to be executed. Upon determining that other commands exist the process returns to step 620 and the loop repeats until the last command has been executed.

Upon determining in step 617 that the last command has been executed the process moves to step 616 and deletes the loaded and executed security commands wherein the security process moves to step 615 and closes itself, before ending at step 614 and returning to the start 601. Optionally the closure of the security process results in the system executing its normal processes that would be performed in response to a successful login. Alternatively, the loaded and executed security commands are not deleted upon completion of the last security command but are either deleted immediately upon execution or stored for another security process to access. Additionally it would be evident that the security process may exploit a single command embedded within another command such as presented supra in respect of FIG. 4.

Numerous other embodiments may be envisaged without departing from the spirit or scope of the invention.

What is claimed is:

1. A method for modifying security parameters of an electronic device, the method comprising:
   receiving a first command at the electronic device, the first command comprising a data portion;
   extracting from the data portion a security rights modification command set comprising at least a command for initiating a secure session at the electronic device and for closing the secure session, wherein initiating of the secure session comprises authentication, and wherein the security rights modification command set is provided for modifying security parameters of the electronic device during the secure session, some of the security parameters modifiable only during a secure session; and
   automatically executing the security rights modification command set with a processor of the electronic device, absent other security rights commands being executed during execution of the security rights modification command set;
   wherein the security rights modification command set comprises a command for logging into a secure session and a command for logging off the secure session; and
   wherein automatically executing the security rights modification command set comprises executing the security rights modification command set to log into the secure session, to modify security rights and to log out of the secure session, the secure session occurring absent execution of intervening commands other than the commands in the security rights modification command set.

2. A method according to claim 1 wherein, automatically executing comprises restricting the processor to a single process prior to executing the security rights modification command set.

3. A method according to claim 2 wherein, automatically executing comprises releasing the restriction to the processor after execution of the security rights modification command set.

4. A method according to claim 1 wherein, automatically executing comprises suspending all other processes in execution by the processor prior to executing the security rights modification command set.

5. A method according to claim 1 wherein, initiating a secure session comprises logging into an administrator account.

6. A method according to claim 5 wherein, closing the secure session comprises logging out of the administrator account.

7. A method according to claim 1 wherein, extracting the security rights modification command set is performed automatically upon processing of the first command.

8. A method according to claim 1 wherein, modifying security parameters comprises modifying security parameters for affecting data access rights.

9. A method according to claim 1 wherein, modifying security parameters comprises modifying at least an application installed on a computer comprising the processor, the application requiring administrator privileges to be modified.

10. A method according to claim 1 wherein, receiving the first command comprises receiving the first command from a communications network.

11. A method according to claim 1 wherein, receiving the first command comprises receiving the first command from a peripheral memory storage device.

12. A method according to claim 1 wherein, modifying security parameters comprises at least one of terminating and suspending a process currently in execution.

13. A method according to claim 1 wherein, the security rights process comprises at least one of a ciphering process, a digital certificate generating process, a digital certificate issuing process, a firewall process, an anti-virus process, a user verification process, a biometric measurement process, an intrusion detection process, a digital rights management process, and an access rights management process.

14. A method according to claim 1 comprising; deleting the first command after execution of the security rights modification command set.

15. A method according to claim 1 wherein, the first command comprises user authentication data.

16. A device comprising:
a port for receiving a first command, the first command comprising a security rights modification command set for initiating a secure session at the device, for modifying security parameters of the device during the secure session, some of the security parameters modifiable only during a secure session, and for closing the secure session; and
a processor for extracting the security rights modification command set from the first command, for establishing a processor environment wherein during a secure session commands other than those within the security rights modification command set are not executed, and for executing the security rights modification command set absent other security rights commands being executed during execution of the security rights modification command set;
wherein the security rights modification command set comprises a command for logging into a secure session and a command for logging off the secure session; and
wherein executing the security rights modification command set comprises executing the security rights modification command set to log into the secure session, to modify security rights and to log out of the secure session, the secure session occurring absent execution of intervening commands other than the commands in the security rights modification command set.

17. A device according to claim 16 comprising; an operating system having different user levels, an administrator user level required for security parameter modification.

18. A device according to claim 16 wherein, the port is for receiving digital data from at least one of a communications network, a removable memory storage medium, a USB memory device, a portable non-volatile memory and a user input device.

19. A method comprising:
receiving a plurality of security rights modification commands each comprising serialization data for at least one of identifying said security rights modification command and ordering said security rights modification command within the plurality of security rights modification commands;
storing the security rights modification commands within a memory;
receiving a first command comprising an indication of a set of security rights modification commands within the plurality of security rights modification commands;
extracting the indication from the first command; and
automatically executing the set of security rights modification commands in dependence of the extracted indication, the set of security rights modification commands for initiating a secure session, for modifying security parameters during the secure session, some of the security parameters for being modified only during a secure session, and, for closing the secure session absent at least one of another security rights command being executed and another secure session being initiated during the secure session.

20. A method according to claim 19 wherein, the serialization data comprises a serial number for identifying uniquely a security rights modification command of the plurality of security rights modification commands.

21. A method according to claim 19 comprising, decoding a data field associated with the first command for extracting the indication therefrom.

22. A method according to claim 19 wherein, the serialization data comprises data for linking a security rights modification command associated therewith and at least another security rights modification command of the plurality of security rights modification commands.

23. A method according to claim 19 wherein, a number of received security rights modification commands within the plurality of security rights modification commands is significantly higher than a number of security rights modification commands within the set.

24. A device according to claim 16, wherein the processor is configured to disable one or more of a keyboard, microphone or mouse input device when automatically executing the security rights modification command set.

* * * * *

UNITED STATES PATENT AND TRADEMARK OFFICE
CERTIFICATE OF CORRECTION

PATENT NO. : 8,380,988 B2
APPLICATION NO. : 12/184480
DATED : February 19, 2013
INVENTOR(S) : Laurence Hamid and Darren Krahn Page 1 of 1

It is certified that error appears in the above-identified patent and that said Letters Patent is hereby corrected as shown below:

In the Specifications:

| Column | Line | Delete | Should Read |
|---|---|---|---|
| 2 | 62 | "administrators duties since" | -- administrator's duties since -- |
| 3 | 6 | "administrator access Tights" | -- administrator access rights -- |
| 3 | 13 | "such admninistrator access" | --such administrator access-- |
| 3 | 47 | "a secure session; and the" | -- a secure session and the -- |
| 3 | 53 | "command, and a processor" | -- command and a processor -- |
| 3 | 63 | "ordering said security rights" | -- ordering rights -- |
| 3 | 65 | "within a memory, and" | -- within memory, and -- |
| 3 | 66 | "modification commands " whereby | -- modification commands, whereby -- |

Signed and Sealed this
Twentieth Day of August, 2013

Teresa Stanek Rea
*Acting Director of the United States Patent and Trademark Office*